United States Patent [19]
Nelson

[11] 3,844,760
[45] Oct. 29, 1974

[54] COMPOSITION FOR AND METHOD OF TREATING WATER
[75] Inventor: George D. Nelson, St. Louis, Mo.
[73] Assignee: Monsanto Company, St. Louis, Mo.
[22] Filed: Feb. 29, 1972
[21] Appl. No.: 230,444

[52] U.S. Cl................................. 71/67, 260/438.1
[51] Int. Cl............................................. A01n 9/36
[58] Field of Search........................................ 71/67

[56] References Cited
OTHER PUBLICATIONS
Kabachnik et al., Chem. Abst., Vol. 69, (1968), 5682b.
Chernova et al., Chem. Abst., Vol. 75, (1971), 54068
Wada et al., Chem. Abst., Vol. 74, (1971), 147013t Primary Examiner—Lewis Gotts
Assistant Examiner—Catherine L. Mills
Attorney, Agent, or Firm—Wayne R. Eberhardt

[57] ABSTRACT

An algicide which is the reaction product of etidronic acid and certain copper salts is found useful for the treatment of water containing algae.

4 Claims, No Drawings

COMPOSITION FOR AND METHOD OF TREATING WATER

This invention relates to compositions for use particularly as algicides for the treatment of water and methods of such treatment.

Algae are small or microscopic organisms which possess an internal green pigment called chlorophyll. This group of organisms are the normal inhabitants of surface waters and are encountered in every water supply that is exposed to sunlight. If ideal conditions for their growth exist in a water supply, it is possible within 24 hours to develop a thriving algae population. Furthermore, if waters contain considerable dissolved minerals and other suspended matter, these serve as nutrients for the growth of algae and other microscopic aquatic life.

The problem of algae control is a serious and ever-present one in swimming pools as well as any water supply exposed to light. The presence of even small numbers of algae in swimming pools or other water supplies tend to clog filters and impart disagreeable tastes and odors to the water. Furthermore, they tend to interfere with the action of chlorine, iodine, bromine, and other common disinfectants used in swimming pools. Chlorine, which is the most widely used disinfectant, is not only a poison to protein systems because of the formation of chloramines, but it is also a powerful oxidizing agent. Thus, if there is any organic matter present in the pool, there will be no free available chlorine until the organic material is destroyed or oxidized by the chlorine. Therefore, it might be assumed that if there is free available chlorine present in a swimming pool, no algae can be alive. However, it has been shown both experimentally in the laboratory as well as in practical tests in swimming pools that the presence of ½ – 1 ppm of free residual chlorine will not kill many strains of algae commonly present in swimming pools even after two hours contact time.

Copper sulfate and other copper salts have also been used to control algae in swimming pools. However, since many pool waters are extremely hard and high in alkalinity, and tend to become more so because of evaporation of water from the pool and by the addition of a variety of pool chemicals, copper sulfate is readily precipitated out and therefore has little effect on the algae. For this reason, copper salts by themselves are not effective against the troublesome strains of algae. Another disadvantage of copper treatment is the possibility of "dyeing" a swimmer's hair or swimming suit in the presence of too high a concentration of copper.

In addition, such copper salts, in general use, lack persistance as algicides because (a) they are precipitated in water with high degrees of hardness or (b) where precautions have been taken to guard against such precipitation by use of sequestrants, the life of the sequestrant is short because of the oxidizing action of such materials as active chlorine.

The disadvantages of the utilization of copper sulfate and other common copper salts as set forth above has been overcome by the discovery that certain copper containing heterocyclic compounds are quite effective as algicides for the treatment of water, particularly those waters which contain active chlorine. These heterocyclic compounds are also stable for indefinite periods of time, both to the action of water hardness and to oxidizing agents such as chlorine, most particularly at levels found in pool water.

It has been found, then, that remarkably improved algistatic and algicidal results can be obtained by the use of such heterocyclic compounds and methods described below. It is shown by the use of such heterocyclic compounds and procedures that algae commonly present in swimming pools, can be killed and readily removed without resorting to such drastic measures as emptying the pool and removing these growths by the use of wire brushes and treatment with muriactic acid. Furthermore, such heterocyclic compounds and methods referred to in this invention overcome the basic objections to the chemicals described above for use as algicides. Such heterocyclic compounds described herein are effective in all types of water whether hard or soft, acid or alkaline. Such heterocyclic compounds are not precipitated out readily as is the case with copper sulfate. Such heterocyclic compounds hereinafter described also will not cause excessive foaming or clouding of the water nor do they have any appreciable adverse effect on the chlorine demand.

One object of the present invention is to provide a composition of matter which will effectively kill (algicidal effect) algae and prevent (algistatic effect) the growth of particularly resistant strains of algae in swimming pools, heat exchangers, air conditioners, and other waters.

Another object of the invention is to provide methods for killing (algicidal effect) algae and preventing (algistatic effect) the growth of algae in swimming pools, heat exchangers, air conditioners and other waters.

Specifically, the present invention covers the treatment of water used in swimming pools, etc. with new compositions of matter, i.e., copper-containing heterocyclic compounds, having the following general formula:

(I) 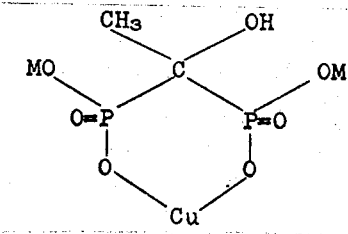

In the above formula (I), M is from the group hydrogen, an alkali metal (such as sodium, potassium), alkaline earth metal (such as calcium), ammonium, tetra-substituted ammonium (such as tetramethyl ammonium), alkyltrimethyl ammonium and dimethyl fatty acid amines (such as dimethyl hexadecyl benzylammonium).

The compounds falling within formula I set forth above (generally called "cupri phosphorinanes" herein) are found to be very effective algicides and do not possess the disadvantages heretofore described in conjunction with the utilization of copper sulfate and other copper salts as algicides.

The compounds falling within formula I are prepared, in general, by reacting etidronic acid, i.e., $CH_3C(OH)(PO_3H_2)_2$, with certain copper salts such as copper sulfate, copper nitrate, copper oxide, copper carbonate and the like. Generally, the etidronic acid is supplied and used as an aqueous solution.

The amounts of the cupri phosphorinanes (Formula I) employed to effectively treat water containing algae can vary. It has been found, however, that treatment with concentrations of as little as 0.10 ppm are toxic to Black Algae, the preferred range being from about .10 to about 2 ppm and more preferably 0.15 to 0.50 ppm. It is to be understood that these concentrations are expressed as parts of copper, in the form of the particular cupri phosphorinane, per million parts of water.

The objectives of this invention will be illustrated but are not limited by the following examples either with respect to the types of cupri phosphorinanes employed or the quantities used.

late swimming pool water conditions by the addition thereto of cyanuric acid (a chlorine stabilizer) and then a pH adjustment was made to 7.5. This first set of aqueous solutions did not contain the algicide compound, but each solution was inoculated with about 1,000 cells of a different algae which are listed in Table I. This first set was the "control" and is listed as such in Table I. Three other sets of 8 each were prepared in the same manner as described above, however, sufficient amounts of the algicide compound were added to the second set, third set and fourth set to yield a level of copper, respectively, of 0.5 ppm (i.e., 0.5 parts of copper per one million parts of aqueous solution), 1.0 ppm and 2.0 ppm. These three sets are identified in Table I in terms of the copper concentration.

TABLE I

| Algae Species | Initiated Inoculation cell level | No Copper "Control" | 0.5 ppm Cu | 1.0 ppm Cu | 2.0 ppm Cu |
|---|---|---|---|---|---|
| Anabaena | 1000 | 31,700 | 0 | 0 | 0 |
| Microcystis | 100 | 2,100 | 0 | 0 | 0 |
| Chlamydomonas | 1000 | 11,625 | 0 | 0 | 0 |
| Ankistrodesmus | 1000 | 19,625 | 0 | 0 | 0 |
| Phormidium | 100 | 2,000 | 2,300 | 2,250 | 2,350 |
| Kirchneriella | 1000 | 8,100 | 0 | 0 | 0 |
| Chlorella | 1000 | 31,200 | 0 | 0 | 0 |
| Selenastrum | 1000 | 15,200 | 0 | 0 | 0 |

EXAMPLE I

Approximately 227 grams of anhydrous copper sulfate, 1580 grams anhydrous sodium sulfate, and 486 grams of a 60% by weight, aqueous solution of etidronic acid are reacted together in a Hobart mixer which revolves at approximately 300 rpm. The copper sulfate and sodium sulfate are added first to the Hobart mixer and then after mixing about one minute, the etidronic acid is added over a period of approximately 20 minutes. This reaction is carried out at atmospheric pressure with all components being at a temperature of about 25°C. At the end of the addition period, the reaction mass temperature reaches about 38°C and the resulting blue powder is slightly lumpy in texture and caking. An additional 40 minutes mixing eliminates substantially all caking tendencies and lumps. The resultant blue powder is a dry, free-flowing material wherein the water is chemically bound as a hydrate.

The above described blue material is analyzed, via nuclear magnetic resonance spectra (NMR) of the $P^{31}$ and $H^1$ nuclei, elemental analysis and potentiometric titration, to contain the compound having the following structure:

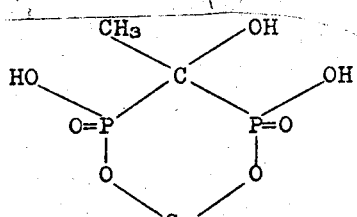

EXAMPLE II

In order to demonstrate the unique algicidal activity of the compound prepared in Example I, the following tests were conducted. Four sets, each containing 8 aqueous solutions in separate flasks, were prepared. In the first set, tap water samples were adjusted to simu- The results set forth in Table I are after a 10 day growth period at about 30°C.

The results set forth above in Table I clearly show that the novel compound in the present invention is effective as an algicide; it killed the growth of seven out of the eight algae. The eighth algae, Phormidium, was inhibited in its growth for the time tested. In each case, a visual observation of the vitality of the cells was made in order to ascertain whether the algae were killed, alive or inhibited in their growth.

EXAMPLE III

In order to demonstrate the unique algicidal activity of the compound prepared in Example I in large bodies of water, three (3) swimming pools located in St. Louis (County), Missouri, were tested and monitored over a period of approximately 12 weeks (ambient temperature ranged from 83° to 88°F). Sufficient amounts of the above described material were added to each pool in order to supply approximately 0.35 parts of copper (in the form of said compound) per 1 million parts of water by weight. This amount was added at one time and then visual observations were carried out during the subsequent 12 weeks.

During and at the end of the 12 week test period, all three swimming pools exhibited an absence of algae such as Ankistrodesmus, Anabena, Chlorella and Selenastrum. Phormidium was controlled in that no appreciable growth was observed. However, prior to the treatment of the pool waters with the above material, algae were growing on a continuous basis and were visually observable.

During the 12 week tests, chlorine was utilized as a disinfectant. Prior to the 12 week test, chlorine was also utilized as a disinfectant, however, infestations of algae appeared regularly as mentioned above, demonstrating that chlorine would not kill the algae present.

As mentioned heretofore, it is well known that copper sulfate would have precipitated out of solution over a similar period of time and, consequently, would not have persistent algicidal activity as compared to the novel cupri phosphorinanes. Thus, it can be seen that the algicide of the present invention is a substantial improvement over the utilization of copper sulfate under similar circumstances and conditions and thus constitutes an advancement in the art.

What is claimed is:

1. A method of effectively killing algae and preventing its growth in water which comprises contacting water containing said algae with an effective amount of an algicide having the formula

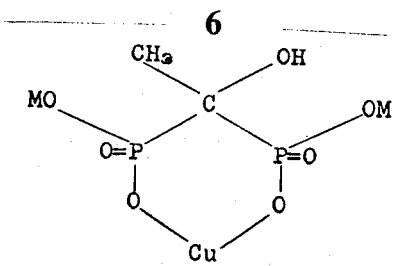

wherein M is hydrogen, an alkali metal, alkaline earth metal or ammonium.

2. The method as set forth in claim 1 wherein M is hydrogen.

3. The method as set forth in claim 2 wherein the concentration of said algicide in said water is at least 0.10 ppm.

4. The method of claim 2 wherein M is sodium or potassium.

* * * * *